Feb. 28, 1950    R. E. NEWELL    2,499,253
AUTOMATIC SAFETY CONTROL FOR GAS BURNERS
Filed Jan. 9, 1946

INVENTOR.
BY Robert E. Newell

Patented Feb. 28, 1950

2,499,253

UNITED STATES PATENT OFFICE 2,499,253

AUTOMATIC SAFETY CONTROL FOR GAS BURNERS

Robert E. Newell, Irwin, Pa.

Application January 9, 1946, Serial No. 639,965

9 Claims. (Cl. 158—117.1)

This invention relates to automatic gas shut-off devices, or "safety pilots," and is of the manual opening type, the object of the invention being to provide a cheaply manufactured and compact design possessing more speed of action and stability under high temperatures than some of the more expensive devices now used for the purpose.

Referring to the drawings.

Figures 1, 2:
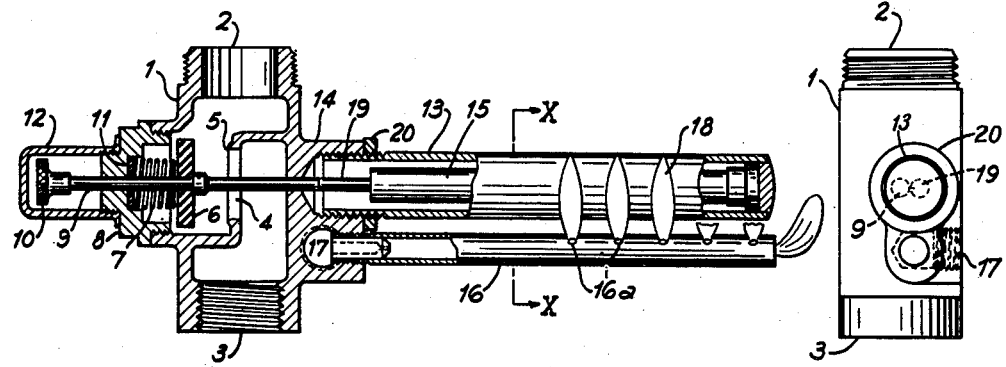
Fig. 1 is a cross section of the entire device on a vertical plane extending through its axis.
Fig. 2 is an end view, looking from the right, of the body portion of the control shown in Fig. 1, with the end wall of the tube removed.

In Fig. 1, the numeral 1 indicates the main housing of the control, which is of the usual valve body construction, provided with a main gas passage, with an inlet 2, and outlet 3, threaded for pipe connections.

Between the inlet and outlet a valve opening 4 is provided, having a seat 5, with which a valve disc 6 cooperates to open or close the main gas supply. Valve disc 6 is preferably made entirely of a synthetic rubber, flexible enough to adapt itself tightly to the seat 5, when closed, yet thick enough and strong enough to retain its normal shape.

Valve disc 6 is normally urged toward seat 5 by spring 7, acting against closure cap 8, and is carried by stem 9, to which, owing to the flexibility of the entire disc, it may be securely fastened or moulded. It is not necessary therefore to provide the usual means to permit loose rocking of the disc upon the stem, which means often permits gas leaks between the disc and the stem.

One end of the stem 9 extends outside of the housing 1, through the closure cap 8, and has attached to it a pull button 10.

The opening through the cap 8, between the stem and the cap, is sealed by an elastic washer 11, which is a snug sliding fit over the stem 9. A further seal is provided by the screw cap 12, which is screwed on to the closure cap 8, and removed only temporarily for access to pull button 10.

The thermal element of the control is essentially similar to that described in my pending application, Serial #572,701, filed January 13, 1945 (Patent No. 2,426,786, issued September 2, 1947).

It consists of a thermal tube 13, having an open end externally threaded and screwed into the boss 14, of the housing 1, the tube extending outwardly therefrom a substantial distance, as may be required for various applications.

The outer end of the tube is closed gas tight by a weld, which weld also secures and supports an operating arm, or latching arm 15, smaller in diameter than the inside bore of the tube, and extending back to a point adjacent the open end of the tube 13.

Cooperating with the thermal tube 13 is a pilot burner 16, also screwed into the boss 14, of housing 1, and extending outward parallel to the tube 13 to a point slightly beyond its end.

The pilot burner 16 may be connected with a source of gas supply on the outlet or inlet side of housing 1, but is usually connected ahead of a thermostat which precedes the safety pilot. Such a connection is made by means of tubing, connected at tapped inlet 17 (see also Fig. 2).

Figures 4, 5, 6:
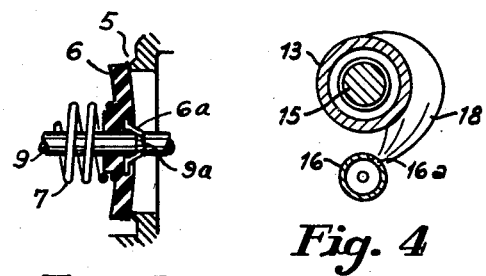
Fig. 4 is a cross section on the line X—X, Fig. 1.
Fig. 5 is a detail section of the valve mechanism.
Fig. 6 is an end view of the thermal tube and latching arm.

Pilot burner 16 is provided with port means 16a, extending a substantial distance back from its outer end, said port means being positioned to propagate a more or less continuous serial flame 18 at an angle tangent to the side of the tube 13 and crosswise to its axis, so that the flame, when properly regulated, will float upwards, curving around and contacting substantially half of the outer diameter of the tube, on one side only, as indicated in Fig. 4. Thus only one side of the tube 13 is heated, and as the tube is of a chrome-nickel-steel alloy having a coefficient of expansion almost equal to copper, and only one-fifth of the heat conductivity of copper, a substantial difference in temperature results between the heated side of the tube and the opposite side, thereby causing an unequal expansion and lateral flexing of the outer end of the tube 13, in a direction away from the flame, and on a substantially horizontal plane passing through the axis of the tube 13 and the midpoint of the flame 18, as indicated by the dotted lines 13a, Fig. 3.

Figure 3:
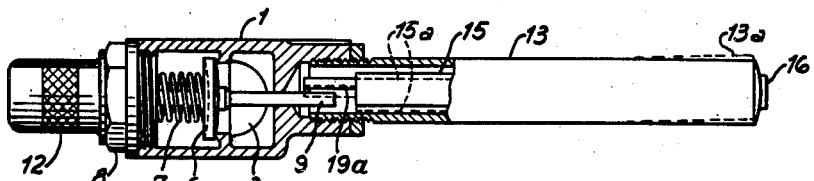
Fig. 3 is a plan view, partly in section, through the horizontal axis of the control.

This flexing action of the tube swings the opposite or free end of the latching arm 15 in the opposite direction, in an amplified degree, as shown by the dotted lines 15a, Fig. 3.

At the free end of the latching arm 15 a hardened latching pin 19 is inserted, slightly off center from the axis of the latching arm 15 as indicated in Fig. 6. The tube 13 is also slightly off center from the axis of stem 9, as indicated in Fig. 2. By this arrangement the lateral distance between the stem 9 and latching pin 19 may be accurately adjusted by rotating the tube 13 in the boss 14, so that when the tube 13 is cold the latching pin 19 will be sufficiently to one side of stem 9 to allow it to clear the end of stem 9, thus permitting the spring 7 to force the valve disc 6 to closed position. The tube 13 is locked in proper adjustment by locking ring 20.

Operation

After igniting the pilot flame 18, in a matter of a few seconds the pull button 10 is pulled outwardly, opening the main gas supply. In the meantime the heat of flame 18 will have flexed tube 13, causing latching arm 15 and pin 19 to swing over to the position shown by dotted lines 15a and 19a so as to hold the stem 9 and valve 6 in open position, as shown in Fig. 1.

Should the flame 18 be extinguished, in a matter of about 6 seconds the thermal tube 13 and latching means 15 and 19 will have returned to nearly their normal position, and thus release stem 9, whereupon spring 7 snaps the valve disc 6 to closed position.

As explained in my prior application, the thermal tube is fully compensated in its action so that even in ambient temperatures as high as 1000 degrees F. the device will operate in four to eight seconds, depending on the setting, whereas thermal elements of the non-compensated type must require several minutes to operate at such elevated temperatures, since they are affected equally as much by ambient temperatures as by the heat of the pilot flame.

I have stated in my said patent that one cause of safety pilot failures in the past has been the practice of loading the thermal element too heavily when in its heated condition. This was intended to apply where the load is in the general direction of thermal action.

In the present invention it is true that the loading force of spring 7, when the valve 6 is latched open, is applied through stem 9, latching means 19 and 15, to thermal tube 13 while said tube is in a highly heated condition.

However, this load is not applied in the direction of the thermal action, which is substantially normal to the axis of the tube, whereas the load is applied in a direction parallel to the tube.

Therefore, should any permanent elongation or growth of the tube take place as a result of the combination of endwise load and high temperatures, it would in no wise affect the stability or calibration of the control. This, of course, is very important.

Since all of the operating mechanism is within the gas chamber of the control itself, no gland pins or diaphragms for sealing the gas are needed. Also, since the arm 15 and pin 19 act as latching means, no trip triggers or levers are required.

The thermal arrangement and latching method above described may of course be applied for other purposes, if desired, as for instance the substituting of an electric switch in place of the present valve disc 6, etc.

Fig. 5 is an enlarged section through the valve portion of the control, illustrating in detail a method of securing valve disc 6 to the stem 9, and also the flexing action of the disc.

A locking washer on collar 6a is moulded or cemented to the disc 6, said washer or collar fitting loosely over the stem 9, and having a protruding portion, which may be in the form of oppositely disposed tongues, which snap into a groove in the stem 9, to hold said stem from slipping endwise in the disc 6.

In the event that the disc 6 is not moulded directly to both washer 6a and stem 9, the central hole in the disc should be of less diameter than the stem 9, so as to fit snugly, and thus positively prevent any leakage of gas between the stem 9 and the disc 6. Fig. 6 shows an inner end elevation of the tube 13 and the rod 15, removed from the housing 14, the rod 15 being turned to such point that the extension 19 is off center with respect to the valve stem 15, to such an extent that slight flexing of the tube will disengage the extension 19 from the end of the valve stem.

I claim:

1. A flame-responsive trip type control unit including a housing, a slidable stem extending through the housing, accessible for manual movement to a first position, a spring mounted to urge said stem toward an opposite or second position, a gas valve seat in the housing, a valve secured to said stem and adapted to rock or flex in a plane substantially normal to said stem for effective cooperation with the valve seat, a thermal tube secured to the housing and extending outwardly therefrom, means propagating a flame which is directed to engage said tube at an angle tangent to the outer surface of the tube, on one side only, thereby heating the tube unequally and flexing it laterally, at its outer end, and a latching arm secured to the outer end of the tube and extending back toward the housing, the movement transmitted to said latching arm from the outer end of said tube being reversed and amplified at the free end of the arm, which is in position, when the tube is flexed by the heat of said flame, to abut against one end of said stem to hold the stem in said first position, and to move clear of said stem and permit the stem, and the control member attached thereto, to move to said second position, when said flame is extinguished and said thermal tube returns to its normal position.

2. A trip-type control, responsive to a flame, including a housing, a control member, a stem extending through the housing and manually movable to shift the control member in one direction, spring means urging said control member and stem in the opposite direction, a thermal element of elongated form secured to the housing and extending outwardly therefrom in parallel alignment with the axis of said stem, said thermal element being self-compensating relative to ambient temperature and adapted to flex laterally at its outer end in response to the direct contact of a flame against one side thereof, and to return to its normal position when said flame is extinguished, a latching bar secured at its outer end to the flexing portion of said thermal element and extending in alignment therewith toward the housing, to amplify the lateral flexing movement transmitted from said thermal element, the inner free end of said latching bar being movable laterally into abutting engagement against the end of said stem to hold it in one position against the force of said spring, when the thermal element is being heated, and eccentric means by which said latching bar is adjusted laterally relative to said stem so that it will release said stem when said flame is extinguished and said thermal element and latching bar have returned to their normal positions.

3. A trip-type control, responsive to a flame, including a housing, a control member, a stem extending through the housing and manually movable to shift the control member in one direction, spring means urging said control member and stem in the opposite direction, a tubular thermal element mounted in the housing and extending outwardly therefrom in parallel alignment with the axis of said stem, said tubular element being adapted to flex laterally at its outer end in response to the heat of a flame arranged to contact one side thereof, and to return to its normal position when said flame is extinguished, a latching bar secured to the flexing portion of said tubular element and extending within the same back toward the housing to amplify lateral movement that results from flexing of the tubular element, the free end of said latching bar being movable into abutting engagement with the end of said stem to hold the stem in one position against the force of said spring, which force is exerted through said latching bar upon the tubular thermal element in a direction parallel to its axis, thereby minimizing the opposition of the spring force to the flexing action of said tubular element, and means providing a manual lateral adjustment of the free end of said latching bar relative to the axis of said stem, whereby said arm may be adjusted to release said stem when said tubular element and said latching bar return to their normal positions.

4. A trip-type control, responsive to a flame, including a housing, a control member, a stem extending through the housing and manually movable to shift the control member in one direction, spring means urging said control member and stem in an opposite direction, a self-compensating tubular thermal element rotatably mounted in the housing and extending outwardly therefrom in parallel alignment with the axis of said stem but slightly offset therefrom, said tubular element being adapted to flex laterally at its outer end in response to the heat of a flame directed upon one side thereof, and to return to its normal position when said flame is extinguished, and a latching bar secured to the flexing portion of said tubular element and extending within the same back toward the housing to amplify movement transmitted by the lateral flexing of said tubular element, the free end of said latching bar being movable into abutting engagement with the end of said stem, when the flame is burning, and being arranged eccentric relative to the axis of said tube, whereby it will be adjusted laterally relative to said stem by manual rotation of said tubular element, to a point where it will automatically release said stem at a desired degree of temperature of the tube, when the flame is extinguished and said tubular element and said latching bar return to their original position.

5. A trip type safety pilot for gas including a housing having a main gas passage therethrough, a valve in the housing to open or close the main gas supply, consisting of a valve disc cooperating with a seat, a stem for the valve disc extending through the housing and manually operable to open said valve, spring means urging said valve disc in the opposite direction to close said valve, a self-compensating tubular thermal element open at one end and closed at the other, the open end being rotatably mounted in the housing, said tubular element extending outwardly therefrom in parallel alignment with said stem but slightly offset from its axis, and said tubular element being adapted to flex laterally at its outer end in response to the heat of a pilot flame directed upon one side thereof and tangent to its sidewall, and to return to normal position when said flame is extinguished, and a latching bar secured within said tubular element, at its closed end, and extending within said tube back toward the housing, to amplify lateral movement transmitted by the flexing action of said tube, the free end of said latching bar abutting against the end of said stem to hold it to open position, against said spring, said free end of said latching bar being provided with a sharply defined edge eccentric relative to the axis of said tubular element, whereby manual rotation of said tubular element will adjust said sharply defined edge, on the free end of the latching bar, laterally relative to said stem, to a position where it will release said stem and valve disc for movement thereof to closed position when the pilot flame is extinguished and said latching bar and tubular element return to normal position.

6. The combination with a valve chamber and a valve having a movable valve stem that is normally urged in one direction by a spring, of a flame-responsive trip unit comprising a thermally-responsive tubular member adapted for connection at its inner end to the valve chamber and being otherwise gas tight, the free portion of the said member being flexible under the application of a flame to one side thereof, and a latching arm generally parallel to said member and rigidly secured at its outer end to the outer end of the member, its other end being adjacent to the inner end of said member and movable into and out of the path of the valve stem, through flexure of said member, whereby the valve stem is releasably held against the spring pressure at one position of the free end of the thermally-responsive member.

7. The combination with a valve chamber and a valve having a movable valve stem that is normally urged in one direction by a spring, of a flame-responsive trip unit comprising a thermally-responsive elongated member adapted for connection at its inner end to a fixed support, the free portion of the said member being flexible under the application of a flame to one side thereof, and a latching arm generally parallel to said member and rigidly secured at its outer end to the outer end of the member, its other end being adjacent to the inner end of said member and movable into and out of the path of the valve stem, through flexure of said member, whereby the valve stem is releasably held against the spring pressure, at one position of the free end of the thermally-responsive member, the arm being radially offset relative to the longitudinal axis of the thermally-responsive member, and the member being adapted for rotative adjustment on a fixed support, whereby the position of the arm with respect to the path of movement of the valve stem will be changed through turning of the said member about its axis.

8. The combination with a valve housing and a gas valve stem that protrudes from a housing and carries a valve that cooperates with a valve seat in the housing and which is normally urged in one direction by a spring, of a flame-responsive trip unit comprising a thermally-responsive tubular member that extends in a direction generally parallel to the valve stem, means for attaching the inner end of the said member to the housing but the member being otherwise-gas-tight, the outer end of the said member being flexible under the application of heat to one side thereof, and a latching arm in the tubular member that is generally parallel to the valve stem and is rigidly secured at its outer end to the outer end of the thermally-responsive member, the inner end of the arm being movable into and out of the longitudinal path of movement of the valve stem, through flexure of the thermally-responsive member, whereby the valve stem is releasably held against the spring pressure at one position of the outer end of the thermally-responsive member.

9. The combination with a valve housing and a movable valve stem that carries a valve and is normally urged in one longitudinal direction by a spring to close the valve, comprising a thermally-responsive elongated member adapted for connection at its inner end to a fixed support, the free portion of the said member being flexible under the application of a flame to one side thereof, and a relatively inflexible, straight latching arm generally parallel to said member and to the valve stem, and rigidly secured at its outer end to the outer end of the thermally-responsive member, its other end being adjacent to the inner end of said member, and being movable laterally into and out of end-to-end relation with the valve stem, through flexure of the said member, whereby the valve stem will be held open against the spring pressure at one position of the free end of the thermally-responsive member and will be released upon flexure of the member from said position.

ROBERT E. NEWELL.

REFERENCES CITED

The following references are of record in the file of this patent:

UNITED STATES PATENTS

| Number | Name | Date |
|---|---|---|
| 1,514,899 | Gilden | Nov. 11, 1924 |
| 1,616,495 | Hill | Feb. 8, 1927 |
| 1,708,446 | Klega | Apr. 9, 1929 |
| 1,966,735 | Sackett | July 17, 1934 |
| 1,980,120 | Walker et al. | Nov. 6, 1934 |
| 1,997,281 | Wegener | Apr. 9, 1935 |
| 2,013,713 | Hamilton | Sept. 10, 1935 |
| 2,049,960 | Jones et al. | Aug. 4, 1936 |
| 2,361,530 | Burch | Oct. 31, 1944 |
| 2,363,525 | Higley et al. | Nov. 28, 1944 |